Jan. 1, 1924

F. H. SNYDER

REBOUND CONTROLLER

Original Filed June 28, 1920    2 Sheets-Sheet 1

1,479,259

WITNESSES
J. Herbel Bradley

INVENTOR
Ferdinand H. Snyder,
by Winter & Brown,
his attorneys.

Jan. 1, 1924. 1,479,259
F. H. SNYDER
REBOUND CONTROLLER
Original Filed June 28, 1920  2 Sheets-Sheet 2
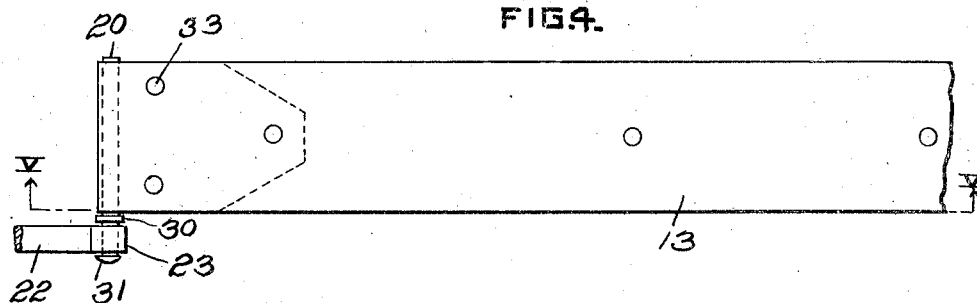
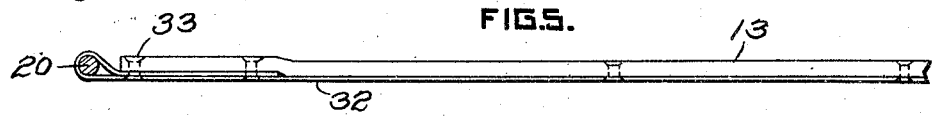
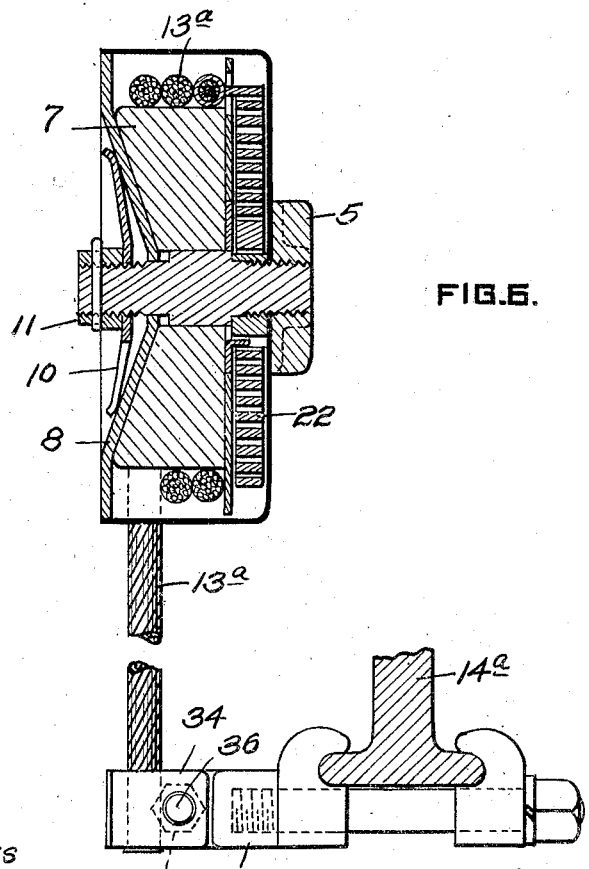

Patented Jan. 1, 1924.

1,479,259

UNITED STATES PATENT OFFICE.

FERDINAND H. SNYDER, OF SHENANDOAH JUNCTION, WEST VIRGINIA, ASSIGNOR, BY MESNE ASSIGNMENTS, TO THE STAR REBOUND CONTROLLER COMPANY, OF CLEVELAND, OHIO, A CORPORATION OF OHIO.

REBOUND CONTROLLER.

Application filed June 28, 1920, Serial No. 392,409. Renewed April 15, 1922. Serial No. 553,013.

*To all whom it may concern:*

Be it known that I, FERDINAND H. SNYDER, a resident of Shenandoah Junction, in the county of Jefferson and State of West Virginia, have invented a new and useful Improvement in Rebound Controllers, of which the following is a specification.

In my Patent No. 1,325,121 there is shown a snubber for preventing sudden or excessive movements between two bodies, as for instance, restraining the rebound of automobile bodies. Briefly described, the snubber shown in such patent comprises a frictionally-resisted rotatable drum on which there is coiled a flexible member adapted to be connected to one of the two bodies between which it is desired to prevent excessive movement. The flexible member is circumferentially slidable upon the drum, and its inner end is connected to a spring adapted to exert a pull upon such member. The arrangement is such that, when the flexible member is stressed by reason of a movement between two bodies, it is held in gripping contact with the periphery of the drum, and that, when the stress is relieved, the member is retracted and coiled upon the drum.

The object of the present invention is to improve and cheapen the construction, and to improve the operation of the snubber of the above-mentioned patent.

Figure 1:
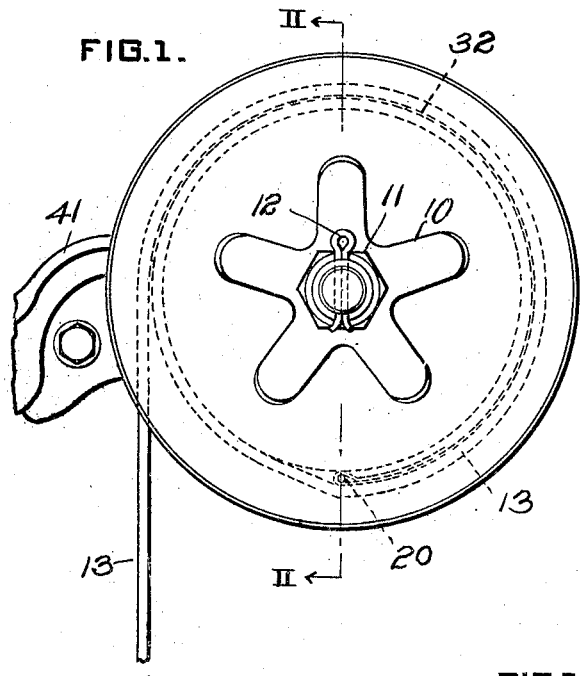
Figure 2:
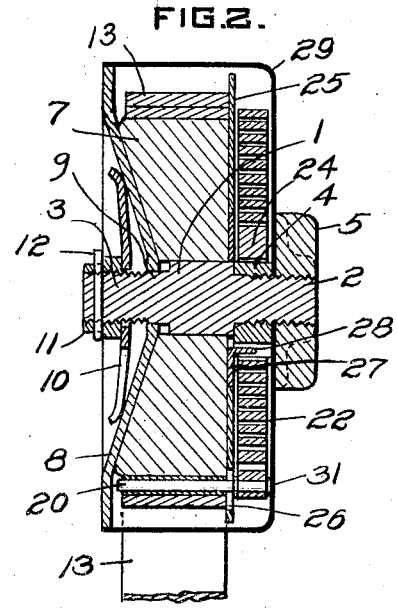
Figure 3:
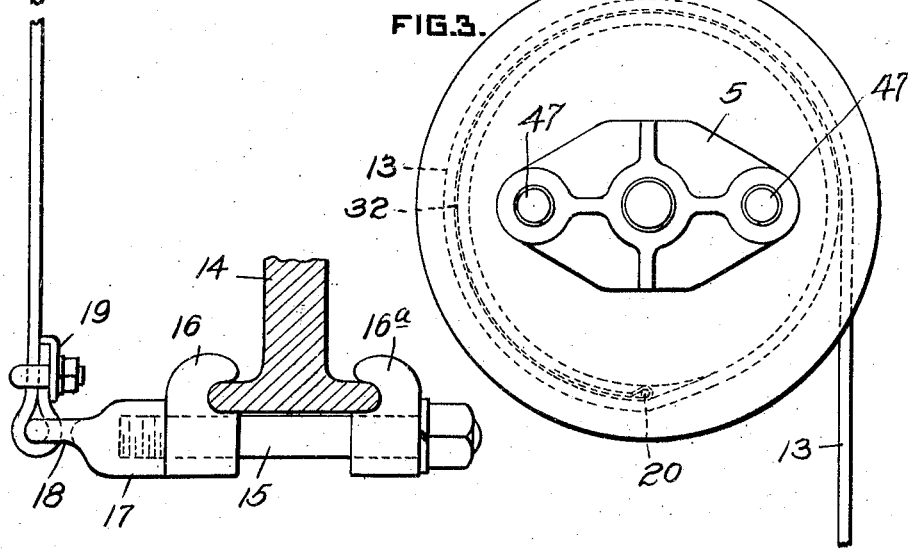

The invention is illustrated in the accompanying drawings, of which Fig. 1 is a side view of the snubber, showing also the attachment of the outer end of the flexible member; Fig. 2 a sectional view taken on the line II—II, Fig. 1; Fig. 3 a view of the side of the snubber opposite to that shown in Fig. 1; Fig. 4 a detail of construction explained hereinafter; Fig. 5 a sectional view taken on the line V—V, Fig. 4; and Fig. 6 a view similar to Fig. 2 showing a modification of construction.

The snubber mechanism is mounted upon, and supported by, an axle having a central cylindrical portion 1 and threaded end portions 2 and 3. Adjacent to the cylindrical portion 1, and upon the threaded portion 2 there is an interiorly-threaded bushing 4, the purpose of which will presently be explained. On the end of the threaded portion 2 there is a bracket 5 provided with openings 47 whereby the snubber may be attached, as for example, to the body of an automobile.

According to the present invention the drum 7, which is mounted upon the cylindrical support section 1, is constructed of self-lubricating material, preferably a block of wood so impregnated with a lubricant as to be self-lubricating. By using such a drum, there is eliminated the necessity of providing special means for lubrication which are expensive and require more or less constant attention, and also there is eliminated the necessity of using a fibrous or other form of friction padding at the point where friction is applied to the drum. The friction may be so applied by means of a metal plate 8 having a non-circular central opening adapted to fit upon a non-circular section 9 of the snubber support. The face of the plate 8 is held in direct frictional contact with the side of the drum by means of a spring washer 10, preferably of star-shape, having the outer ends of its projections bearing upon the plate. The spring washer is held in place, and its degree of compression adjusted, by a nut 11 applied to the screw-threaded section 3 of the support and held in its adjusted position by means of a cotter-pin 12.

The flexible connecting member 13 is coiled upon the periphery of the drum 7, and, when such member is in the form of a band as shown in Figs. 1 and 2, its outer end may be attached to the axle 14 or running gear of an automobile in the manner illustrated in Fig. 1. The connecting clamp there shown comprises a bolt 15 having loosely mounted thereon a pair of oppositely disposed hook-shaped fingers 16 and 16ᵃ adapted to engage the flanges of the axle 14. The threaded end of the bolt engages a sleeve 17 provided with an eye 18 through which the end of the flexible member 13 may be looped and clamped upon itself by means of a suitable clamp 19.

The other end of the flexible member 13 is coiled, and circumferentially movable, upon the drum 7, and a spring is so attached to the end of such member that, when the outer end of the member is placed under tension by rebound movement of the automobile, the spring will hold the inner end of the flexible member in snubbing engagement with the drum, and that, when the tension is relieved upon the outer portion of the flexible member, the spring will act upon the inner end of such member to slide it circumferentially upon the drum, thereby taking up the slack.

Preferably, a coil spring 22 of the shape shown in Fig. 2 is used to accomplish the operations just explained. While the spring 22 and flexible member 13 may be variously attached to each other, the connection for this purpose is preferably that illustrated in Figs. 4 and 5. The end of the spring 22 is provided with a loop or eye 23 which fits over the outer end of the pin 20, such pin being provided with a shoulder 30 to prevent movement of the spring toward the flexible member, and being upset on its outer end, as at 31, to prevent the spring from slipping off the end of the pin. To the outer face of the flexible member there is attached a flexible metal band, such as a strip of brass 32, the end of which is looped over the pin 20 and riveted upon itself and to the flexible member by means of rivets 33. The band 32 is preferably extended on the outer face of the member 13 to a distance equivalent to about three-fourths of the circumference of the drum, as indicated by the heavy dotted line on Fig. 1. This band affords a smooth surface so that the outer convolution of the flexible member may freely slide upon the inner convolution thereof.

To anchor the inner end of the spring 22, such end is bent inwardly, as indicated at 24, and lies in a slot or opening formed in the non-rotatable bushing 4.

Between the drum 7 and the inner face of the coil spring there is arranged a disc or annular plate 25 which preferably rotates according to the movement of the outer end of the spring 22. For this purpose the outer edge of the disc is provided with a slot 26 through which the pin 20 extends, so that the disc rotates in proportion to the winding and unwinding of the spring. Arranged within the central opening of the disc 25, and between the inner portion of the drum and spring, there is a thrust bearing plate 27 held against rotation with the drum by means of a finger 28, which is bent laterally from the plate and projects into a suitable opening formed in the bushing 4. One face of the plate 27 bears against the bushing 4 and its other face affords a thrust bearing for the drum 7.

The snubber mechanism is suitably enclosed in a casing 29, the outer edge of which bears loosely upon the periphery of the plate 8, and the central portion of which is clamped between the bushing 4 and bracket 5. The casing extends adjacent to the outer face of the coil spring 22, and, together with the disc 25 forms a housing for the spring to prevent it from spreading outwardly from the drum.

In the modified form of construction illustrated in Fig. 6 the flexible member 13ª is cylindrical in cross section so that all of its convolutions upon the drum are in direct contact therewith. Otherwise, the snubber mechanism shown in this figure is the same as that shown in and described with reference to, Figs. 1, 2 and 3. For attaching the outer end of the flexible member 13ª to the axle 14ª the sleeve portion 17ª of the axle engaging clamp is attached to a pair of clamping jaws 34 which engage the end of the flexible member 13ª, such end being gripped by tightening a nut 35 on a bolt 36 extending through the clamping jaws 34.

When the snubber is attached to an automobile, the snubber supporting bracket 5 is fastened to the body or other suitable part of the machine and the outer end of the flexible member 13 is clamped to the axle. The inner end of the flexible member is so adjusted upon the drum 7 that the spring 22 is under tension of preferably about one revolution when the car body is in neutral position. Such adjustment of course depends upon the strength of the spring. When the springs of the automobile are compressed, as for example when the automobile passes over a rough spot in the road, the spring 22 of the snubber will cause the flexible member to be further wound upon the drum 7 in proportion to the amount which the automobile spring has been compressed. This has the effect of taking up the slack in the outer end of the flexible member. As soon as the automobile spring rebounds, the flexible member 13 is placed under tension, and the spring 22 holds the inner end of such spring against the drum 7 so that a snubbing action takes place which has the effect of retarding the rebound of the car body. This retardation of the rebound is in proportion to the resistance of the drum 7 against rotation, such resistance being effected by the friction plate 8. The amount of this resistance may be regulated and varied for cars of different weights, and for other conditions of service, by adjusting the nut 11 so as to place the spring plate 10 under greater or less tension, as may be desired.

The drum 7 rotates only when the outer end of the flexible member 13 is stressed by reason of rebound. When the axle and car body move toward each other, the snubber spring 22 winds the flexible member upon the drum which remains stationary. When the automobile is traveling over rough roads the snubber is brought into action continually and very adequately prevents excessive rebounds, such as are liable to break springs, and which cause considerable discomfort to those riding in the car. Each time the snubber is brought into action the drum 7 rotates, so that there is considerable wear and tear upon it. By constructing the drum of self-lubricating material as explained above, the life of the drum is very materially prolonged and the snubber does not require continued lubrication.

The construction of the snubber is such that it may be readily disassembled for repair or cleaning by merely removing the nut 11 from the threaded sections 3 of the support. When such nut has been removed, the spring plate 10, friction plate 8, and drum 7 may be readily removed from the support. Thereafter the disc 25, thrust bearing 27 and spring 22 may be also removed, leaving the snubber support attached to the bracket 5.

According to the provisions of the patent statute, I have described the principle and operation of my invention, together with constructions representing the embodiments thereof. However, I desire to have it understood that, within the scope of the appended claims, the invention may be practiced by other forms of construction than those specifically shown and described herein.

I claim:—

1. In a rebound controller the combination of a rotatable frictionally-resisted drum constructed of self-lubricating material, a flexible connecting member coiled on said drum, a friction member having a face directly in contact with said drum, and means to maintain tension on the inner end of said flexible member.

2. In a rebound controller, the combination of a rotatable frictionally-resisted drum comprising a block of wood saturated with lubricant, a flexible connecting member coiled on said drum, a metal friction plate bearing directly upon a side of said drum, and means for maintaining tension on the inner end of said flexible member.

3. In a rebound controller, the combination with a support, of a frictionally-resisted drum rotatable thereon, a flexible connecting member coiled on said drum, a coiled spring at a side of said drum having its inner end attached to said support and provided with a loop at its outer end, and a laterally extending pin engaged by said loop and connected to the inner end of said flexible member.

4. In a rebound controller, the combination with a support, of a frictionally-resisted drum rotatable thereon, a flexible connecting member coiled on said drum, a coiled spring at a side of said drum and having its opposite ends attached to said support and to the inner end of said flexible member, a casing attached to said support and extending adjacent to one side of said spring, and a disc arranged between said drum and the other side of said spring, said casing and disc forming a housing for said spring.

5. In a rebound controller, the combination with a support, of a frictionally-resisted drum rotatable thereon, a flexible connecting member coiled on said drum, a coiled spring at a side of said drum and having its opposite ends attached to said support and to the inner end of said flexible member, a disc attached to said support and forming a thrust bearing for the central portion of said drum, and an annular plate arranged between the outer portion of said drum and spring and rotatable with the spring.

6. In a rebound controller, the combination of a rotatable frictionally-resisted drum, a flexible band coiled in superposed convolutions upon said drum, the outside of the inner portion of said band being faced with a smooth flexible strip of metal, and means to maintain tension on the inner end of said band.

7. In a rebound controller, the combination of a rotatable frictionally-resisted drum, a flexible band coiled in superposed convolutions upon said drum, a coil spring fixed at its inner end and attached to a pin at its outer end, and a strip of smooth flexible metal looped around and carrying said pin and secured to the inner end of said band, said strip of metal forming a facing for the outside of a portion of the inner end of said band.

8. In a rebound controller, the combination with a support of a frictionally resisted drum rotatable thereon, a flexible member coiled on said drum and having a loop at its inner end provided with a laterally projecting spring connector, and a coil spring at the side of the drum having its inner end attached to said support and having its outer end connected to said spring connector.

9. In a rebound controller, the combination with a support of a frictionally resisted drum rotatable thereon, a flexible member coiled on the drum and having at its inner end a metal portion formed into a loop, a spring connecting pin mounted in said loop and projecting laterally therefrom, and a coil spring at the side of the drum having its inner end attached to said support and its outer end connected to said pin.

10. In a rebound controller, the combination with a support of a frictionally resisted drum rotatable thereon, a flexible band coiled in superposed convolutions upon said drum, the inner portion of said band being faced with metal which extends a substantial distance around the drum, and a coil spring located at one side of the drum and having its inner end attached to said support and its outer end connected to said band.

11. In a rebound controller, the combination with a support of a rotatable frictionally resisted drum on said support, a flexible band coiled in superposed convolutions upon said drum and having its inner portion faced with metal and at its inner end provided with a loop, of a spring connector mounted in said loop and projecting laterally therefrom, and a coil spring surrounding said support at the side of the drum and having its inner end attached to said support and its outer end attached to said spring connector.

12. In a rebound controller, the combination with a fixed support of a frictionally resisted drum rotatably mounted thereon, a substantially cylindrical casing through which said support extends, a thrust plate non-rotatably mounted on the support inside the casing and engaged by one face of the drum so as to frictionally resist its movement, a friction disk non-rotatably supported on said support and pressed yieldingly against the opposite face of the drum, a flexible member coiled on said drum, and a spring having its inner end connected to said support and its outer end connected to the inner end of said flexible member.

13. In a device of the character described, a self-lubricating drum, a friction member engaging the drum to frictionally resist its rotating movement, a flexible member adapted to be wound onto and unwound from the drum and serving to rotate the drum as it is unwound; and a spring yieldingly resisting the unwinding of said member and the accompanying rotation of the drum.

14. In a rebound controller, a rotatable non-metallic self-lubricating drum, a friction member engaging the drum to frictionally resist its rotating movement, a flexible connecting member adapted to be unwound from and wound onto the drum, and a spring for keeping the flexible connecting member taut.

15. In a rebound controller, two relatively rotatable members, one in the form of a drum and the other in the form of a friction member opposing its movement, one of said members being formed of self-lubricating material, a flexible member adapted to be unwound from and to be wound onto the drum and to rotate the drum as it is unwound therefrom, and a spring having its inner end fixed and its outer end arranged to yieldingly resist the unwinding of said flexible member and the consequent rotation of the drum.

16. In a rebound controller, a rotatable drum, a member for frictionally resisting the movement of the drum, said member and drum having engaging portions, one formed of self-lubricating material, a flexible member adapted to be unwound from and to be wound onto the drum and to rotate the drum as it is unwound therefrom, and a spring associated with the drum and serving to yieldingly resist the unwinding of said flexible member and the consequent rotation of the drum.

17. In a rebound controller, a rotary drum, a member for frictionally resisting the movement of the drum, said drum and member having engaging portions, one formed of non-metallic oil impregnated material, a flexible member adapted to be unwound from and to be wound onto the drum and to rotate the drum when it is unwound therefrom, and a spring associated with the drum and serving to yieldingly resist the unwinding of said flexible member and the consequent rotation of the drum.

In testimony whereof, I have hereunto set my hand.

FERDINAND H. SNYDER.

Witnesses:
J. J. LYNE,
ELINOR O. LYNE.